United States Patent

[11] 3,602,744

| [72] | Inventor | Hans W. Hugli |
| | | Williamsville, N.Y. |
| [21] | Appl. No. | 832,086 |
| [22] | Filed | June 11, 1969 |
| [45] | Patented | Aug. 31, 1971 |
| [73] | Assignee | Kistler Instrument Corporation |
| | | Clarence, N.Y. |

[54] WELDED PRESSURE TRANSDUCER
18 Claims, 4 Drawing Figs.

[52] U.S. Cl. ........................................................... 310/8.7, 310/8.4
[51] Int. Cl. ........................................................... H01v 7/00
[50] Field of Search .......................................... 310/8, 8.7, 8.4, 9.1

[56] References Cited
UNITED STATES PATENTS

| 3,349,259 | 10/1967 | Kistler | 310/8.7 |
| 2,894,317 | 7/1959 | Marks | 29/155.5 |
| 3,351,787 | 11/1967 | Kistler | 310/8.4 |
| 3,364,368 | 1/1968 | Sonderegger | 310/8.7 |
| 3,322,980 | 5/1967 | Faure | 310/8.7 |
| 2,917,642 | 12/1959 | Wright et al. | 310/8.3 |
| 3,393,331 | 7/1968 | Puckett | 310/8.3 |
| 3,424,930 | 1/1969 | List et al. | 310/8.7 |

*Primary Examiner*—Milton O. Hirshfield
*Assistant Examiner*—B. A. Reynolds
*Attorney*—LeBlanc & Shur

ABSTRACT: Disclosed is an improved quartz crystal pressure transducer of simplified and less expensive construction. A plurality of quartz wafers are retained in a preloading sleeve formed integral with the transducer base. An end piece formed of a ceramic or beryllium is surrounded by a stainless steel ring and welded to a stainless steel pressure diaphragm. The ring is also welded to the end of the preloading sleeve remote from the transducer base.

PATENTED AUG 31 1971

3,602,744

INVENTOR
HANS W. HUGLI

BY LeBlanc & Shur

ATTORNEYS

WELDED PRESSURE TRANSDUCER

This invention relates to piezoelectric force transducers and more particularly to a welded pressure transducer having improved operating characteristics and one which is less expensive to manufacture. In the present invention the preloading sleeve for the transducer module is machined integral with the transducer base and welded at its other end to the piezoelectric module. While particularly disclosed and described in conjunction with a pressure transducer, the preloading assembly of the present invention is equally applicable to other force transducers such as accelerometers and the like.

In assignees U.S. Pat. No. 3,349,259 patented Oct. 24, 1967, there is disclosed an improved pressure transducer of the piezoelectric type incorporating both acceleration and temperature compensation. In the device of that patent, the transducer module takes the form of a piezoelectric stack of quartz crystal wafers surrounded by a preloading sleeve secured to the transducer base. This makes possible a transducer which may be used over a wide frequency range without evidencing the phase problems of prior constructions especially at high frequencies. Temperature compensation is incorporated to minimize temperature generated stresses in the crystals which otherwise tend to produce error signals at the output. In assignee's U.S. Pat. No. 3,351,787 patented Nov. 7, 1967, there is disclosed a modified force transducer in the form of an accelerometer in which the prestressing or preloading sleeve is spot welded in a novel manner around a stack of piezoelectric quartz crystal wafers.

The present invention is directed to a piezoelectric force transducer of the same general construction which preserves the advantages of the patented devices, but which is of simpler and less expensive construction. In the transducer of the present invention, the preloading sleeve is formed integral with the transducer base and is preferably spot welded at its other end to the quartz crystal module. The module includes an end piece of either heat insulating ceramic material or a light weight metal such as beryllium engaged by a surrounding stainless steel ring to which the preloading is welded. Not only does the integral preloading sleeve make possible a simpler and less expensive construction, but it further insures greater isolation of the temperature sensitive components during the welding process so that the transducer is less likely to develop temperature generated stresses in the crystals which tend to produce error signals at the transducer output. By welding the end of the preloading sleeve remote from the transducer base, it is possible to form a good hermetic seal and to substantially reduce undesirable low frequency diaphragm resonances in the pressure transducer.

It is, therefore, one object of the present invention to provide an improved piezoelectric force transducer.

Another object of the present invention is to provide a force transducer in which a piezoelectric module is surrounded by a preloading sleeve formed integral with the transducer base.

Another object of the present invention is to provide an improved piezoelectric pressure transducer.

Another object of the present invention is to provide a piezoelectric pressure transducer incorporating a stack of piezoelectric wafers surrounded by a prestressing sleeve welded to the end of the stack remote from the transducer base.

Another object of the present invention is to provide a hermetically sealed piezoelectric pressure transducer of simplified and less expensive construction in which a preloading sleeve is welded to a metal ring surrounding the end of a piezoelectric stack or module remote from the transducer base.

Another object of the present invention is to provide an improved pressure transducer substantially less subject to the generation of error signals due to stresses set up by the effects of excessive temperature acting on the quartz crystals.

These and further objects and advantages of the invention will be more apparent upon reference to the following specification, claims, and appended drawings wherein:

Figure 1:
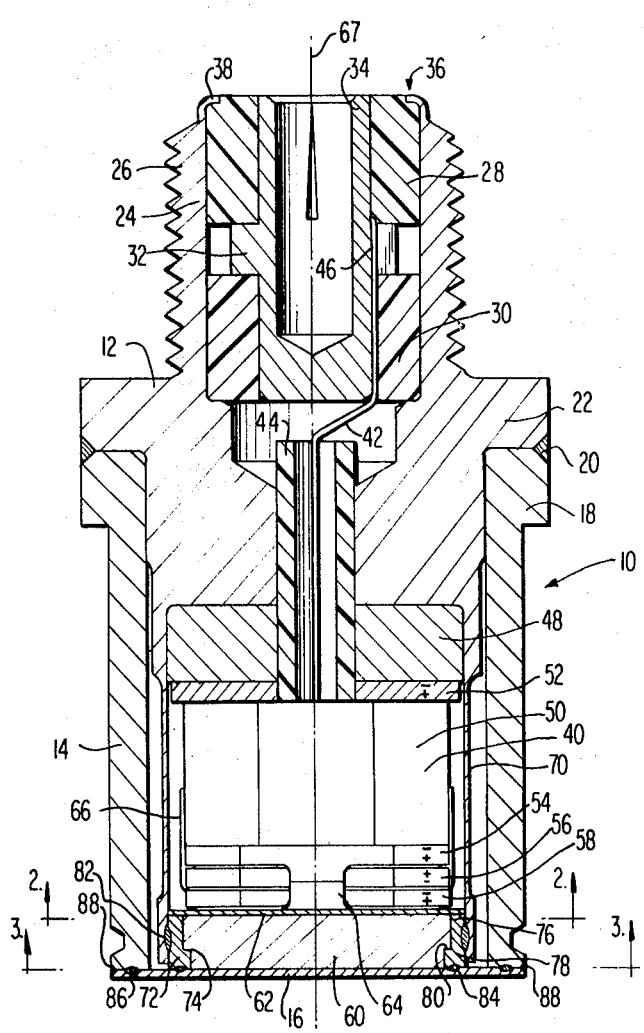
FIG. 1 is an elevational view with parts in section of a piezoelectric pressure transducer constructed in accordance with the present invention.
Figure 2:
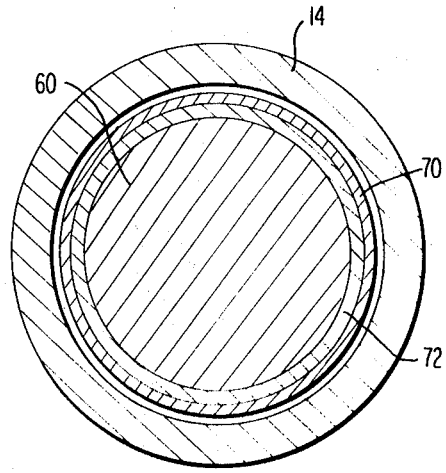
FIG. 2 is a cross section through the transducer taken along line 2—2 of FIG. 1.

Referring to the drawings, the novel transducer of the present invention is generally indicated at 10 in FIG. 1 and comprises a housing including a base 12 and a surrounding jacket or sleeve 14 having its lower end connected to a metal, pressure responsive diaphragm 16. Jacket 14 is provided with a flange 18 which is hermetically sealed as indicated at 20 by heli-arc welding to a similar flange 22 formed on base 12.

The upper end of base 12 is of reduced cross section as indicated at 24 and carries external threads 26 which form the outer conductor of a coaxial cable connector. Received within the reduced end 24 of the base are a pair of electrically insulating Teflon rings 28 and 30 which engage a flange 32 of a female coaxial receptacle 34 forming the inner conductor of the coaxial connector which connector is generally indicated by the reference numeral 36. The ends of the base 24 are turned over as at 38 to retain insulators 28 and 30 and inner conductor or female receptacle 34 within the base.

Positioned within jacket 14 is a piezoelectric module generally indicated at 40 which module develops an electrical output signal in response to deflection of diaphragm 16. This signal is taken from the module by way of lead 42 passing through insulating sleeve 44 and soldered or otherwise electrically connected to female receptacle 34 as indicated at 46. One side of the electrical output is developed on lead 42 and applied to the inner coaxial connector conductor while the other side of the electrical output is taken from the threaded end 26 of base 24 forming the outer conductor of coaxial connector 36. As is customary, the outer conductor may be suitably grounded so that the output signal is developed between receptacle 34 and ground.

Module 40 positioned within jacket 14 comprises a stainless steel module base 48 and a seismic mass 50 between which is sandwiched an acceleration compensation quartz plate or wafer 52. Wafer 52 is preferably connected with the polarity indicated in the drawing. On the other side of seismic mass 50 are three quartz plates or wafers 54, 56, and 58 preferably also connected with the polarity indicated in FIG. 1. Between the quartz wafers are silver or gold discs which form electrodes for the quartz crystals. The crystals are preferably separated from an endpiece 60 of the module by a thin disc 62 of mica or other good heat insulating material. The electrical signals from the quartz wafers are developed on bent over tabs 64 and 66 connected respectively to the grounded case and to the output lead 46.

Quartz crystal 52 provides for acceleration compensation in the transducer 10 in the manner set forth in assignee's U.S. Pat. No. 3,349,259. That is, crystal 52 is connected in opposition to the other three crystals 54, 56, and 58. The masses of the members forming the individual parts of the module 40 are chosen so that for acceleration forces acting along the transducer axis 66, the output from crystal 52 is equal and opposite to the total output from crystals 54, 56, and 58. This compensation can be achieved because of the fact that the total seismic mass acting on the crystal stack comprising crystals 54, 56, and 58 is much smaller than the total seismic mass including the heavy element 50 acting on the single crystal 52. By properly selecting the size of the masses, the two outputs can be made to cancel for acceleration forces. It is understood, however, that pressure forces acting through diaphragm 16 act equally on all crystals so that the output of crystal 52 in response to pressure forces cancels the output of only one of the crystals 54, 56, and 58. The effective output of the transducer in response to pressure forces on diaphragm 16 is equal to the output of two of the crystals.

The quartz crystals of the transducer 10 are preferably X-cut crystals with their X axis lying along axis 67 of the transducer. As is well known X-cut quartz crystals are also sensitive along the Y axis extending normal to the transducer axis 67. As a result, it is highly desirable to avoid lateral stresses on the quartz crystals particularly resulting from excessive temperatures since stresses not only along the X axis but also along the transverse Y axis tend to produce errors in the transducer output. It is an important feature of the present invention that the construction of the transducer 10 is such that it may be welded in an efficient and inexpensive manner while at the same time minimizing the the effect of welding temperatures on the materials of the transducer module and associated structure. To this end, base 12 is machined with integral sleeve 70 which acts as a preloading sleeve for the quartz crystal module 40. The sleeve applies an initial preloading stress or compression force along the axis 67 squeezing the crystals between module base 48 and end piece 60 of the transducer. In order to reduce the weight of the module mass and to increase insulation of the quartz crystals from excessive temperatures, the endpiece 60 is made of a suitable ceramic material or preferably from beryllium metal. Surrounding end piece 60 is a stainless steel ring 72 provided with a shoulder 74 defined by the juncture of the reduced diameter section 76 and the enlarged diameter section 78 of the ring. This shoulder mates with a cooperating shoulder 80 on end piece 60 which also has larger and small diameter portions defining this shoulder. Finally, the end of prestressing sleeve 70 is welded to end piece ring 72 as indicated at 82 by a plurality circumferentially spaced spot welds in the manner shown in assignee's U.S. Pat. No. 3,351,787.

Diaphragm 16 is spot welded to ring 72 as indicated at 84 in FIG. 1 and is also spot welded as at 86 to the end of sleeve or jacket 14. The circumferential edge of the diaphragm and sleeve are hermetically sealed by heli-arc welding at 88.

Figure 3:
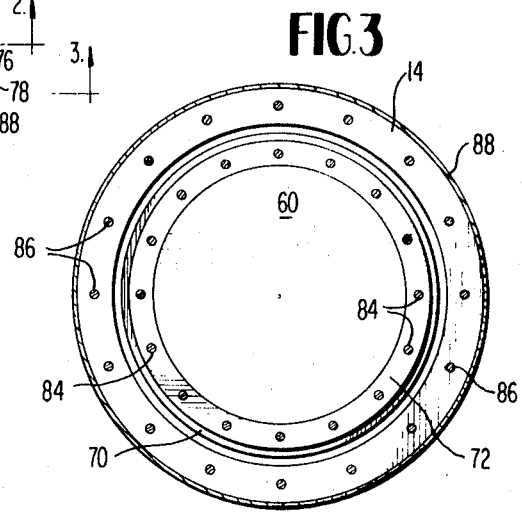
FIG. 3 is a cross section through the transducer taken along line 3—3 of FIG. 1 and showing the spot welds.

The spot welds at 84 and 86 as best seen in FIG. 3 are circumferentially spaced about the periphery of the transducer and are each preferably 16 in number spaced at equal angles about the transducer axis. However, it is understood that more spot welds may be used if desired, and as many as 50 or 100 may be placed right next to each other to provide a hermetic seal. Likewise, rather than spot welding the elements may be joined by a solid layer of solder between the diaphragm and the end piece to further help eliminate low frequency diaphragm resonances.

Figure 4:
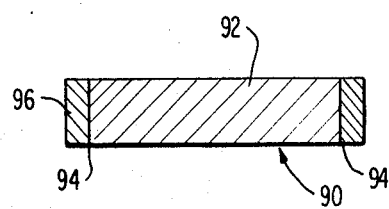
FIG. 4 is a view showing a modified end piece for the transducer of FIG. 1.

FIG. 4 shows a modified endpiece construction 90 comprising a central disc 92 preferably of beryllium, silver soldered as at 94 to a surrounding stainless steel ring 96. Endpiece 90 may be substituted for the endpiece 60 and ring 72 of FIG. 1, but requires the silver soldering step which is eliminated in the embodiment of FIG. 1 by the cooperating shoulders 74 and 80 on the ring and endpiece.

In construction the module 40 is first inserted into the prestressing sleeve 70. This sleeve is then pulled or stretched to exert a prestressing force on the quartz wafers and then spot welded as at 82 to ring 72. Once the prestressing sleeve 70 is rigidly secured to ring 72, its end is trimmed and diaphragm 16 placed over the end of the transducer and welded to the end piece ring and to the end casing or sleeve 14. As previously mentioned, casing 14 is sealed to base 22 by heli-arc welding as at 20 in FIG. 1.

It is apparent that the present invention provides an improved force transducer construction and particularly an improved quartz wafer piezoelectric pressure transducer which is economical and simple to manufacture, but at the same time has improved operating characteristics with increased insensitivity to high temperatures which might otherwise adversely affect the transducer output. Important features of the present invention include the provision of the preloading sleeve integral with the transducer base and a preloading sleeve that is welded to the quartz module at the end of the module remote from the transducer base. Improved frequency response is provided by a ceramic or preferably beryllium end plate surrounded by a stainless steel ring so that it may readily be welded to the stainless steel prestressing sleeve. By spot welding a stainless steel diaphragm to the endpiece or otherwise insuring rigid connection between the endpiece and the diaphragm as by a continuous weld, low frequency diaphragm resonances are significantly reduced. Heat insulation is further enhanced by provision of a small mica disc 62 between the endpiece and the quartz crystal stack so that the crystal is at all times heat insulated from excessive temperatures.

What is claimed and desired to be secured by U.S. Letters Pat. is:

1. A force transducer comprising a housing including a rigid base, a piezoelectric element and an endpiece within said housing, said piezoelectric element being sandwiched between said endpiece and said base, and a preloading sleeve surrounding said piezoelectric element and formed at one end integral with said base, said preloading sleeve being spaced from the remainder of said housing and secured at its other end to said endpiece.

2. A transducer according to claim 1 wherein said preloading sleeve is welded to said endpiece.

3. A transducer according to claim 2 wherein said endpiece comprises a beryllium disc surrounded by a metal ring, said sleeve being welded to said ring.

4. A transducer according to claim 3 wherein said disc and ring are stepped to provide cooperating shoulders holding said ring and disc together.

5. A transducer according to claim 3 wherein said disc and ring are soldered together.

6. A transducer according to claim 2 wherein said endpiece comprises a ceramic disc surrounded by a metal ring, said sleeve being welded to said ring.

7. A force transducer comprising a housing including a rigid base, a coaxial connector mounted on said housing, at least one piezoelectric wafer and an endpiece mounted in said housing, said wafer being located between said endpiece and said base, a preloading sleeve surrounding said piezoelectric wafer and formed at one end integral with said base, said preloading sleeve being spaced from the remainder of said housing and welded at its other end to said endpiece, and an electrical lead in said housing coupling said piezoelectric wafer to said coaxial connector.

8. A force transducer according to claim 7 wherein said sleeve is connected to said endpiece by a plurality of circumferentially spaced spot welds.

9. A force transducer according to claim 7 wherein said sleeve and base are made of stainless steel, said endpiece comprising a central disc surrounded by a stainless steel ring.

10. A force transducer according to claim 7 wherein said piezoelectric wafer is made of X-cut quartz.

11. A force transducer according to claim 10 including a stack of X-cut quartz wafers within said sleeve, and a seismic mass within said sleeve and acting on at least one of said wafers.

12. A force transducer according to claim 7 including a mica disc between said endpiece and said piezoelectric wafer.

13. A pressure transducer comprising a housing including a rigid base, a coaxial connector mounted on said housing, a quartz crystal wafer and an endpiece mounted in said housing, said wafer being located between said endpiece and said base, a preloading sleeve surrounding said piezoelectric wafer and formed at one end integral with said base, said preloading sleeve being spaced from the remainder of said housing and secured at its other end to said endpiece, means in said housing coupling said quartz crystal wafer to said coaxial connector, and a metal diaphragm secured to the opposite end of said housing from said base for applying pressure forces to said end piece.

14. A pressure transducer according to claim 13 wherein said endpiece is welded to both said preloading sleeve and said diaphragm.

15. A pressure transducer according to claim 13 wherein said base, sleeve and diaphragm are all made of stainless steel, said endpiece comprising a central disc and a surrounding stainless steel ring, and a plurality of circumferentially spaced spot welds securing said ring to both said sleeve and said diaphragm.

16. A pressure transducer according to claim 15 wherein said ring and disc are both stepped to provide cooperating annular shoulders retaining said disc and ring together under the preloading pressure of said sleeve.

17. A pressure transducer according to claim 16 wherein said endpiece disc is made of beryllium.

18. A pressure transducer according to claim 13 including first and second groups of quartz crystal wafers between said endpiece and base, said first group having a greater number of wafers being located nearer said endpiece and separated from said second group by a seismic mass, the masses of said wafers and seismic mass being such that the outputs of said quartz crystal groups cancel for acceleration forces along the axis of said sleeve.